United States Patent
Chen

(10) Patent No.: US 9,906,149 B2
(45) Date of Patent: Feb. 27, 2018

(54) SWITCHING POWER SUPPLY WITH BURST OPERATION IN STANDBY MODE

(71) Applicant: FUJI ELECTRIC CO., LTD., Kawasaki-shi, Kanagawa (JP)

(72) Inventor: Jian Chen, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/581,338

(22) Filed: Apr. 28, 2017

(65) Prior Publication Data

US 2017/0373604 A1   Dec. 28, 2017

(30) Foreign Application Priority Data

Jun. 24, 2016   (JP) .................... 2016-125702

(51) Int. Cl.
*H02M 3/335* (2006.01)
*H02M 1/36* (2007.01)
*H02M 1/42* (2007.01)

(52) U.S. Cl.
CPC ......... *H02M 3/33553* (2013.01); *H02M 1/36* (2013.01); *H02M 1/4241* (2013.01)

(58) Field of Classification Search
CPC . H02M 2001/0012; H02M 2001/0035; H02M 1/088; H02M 3/157; H02M 3/158; H02M 3/33515; H02M 3/33569
USPC ..... 323/271, 282, 283, 284, 288; 363/21.02, 363/21.05, 21.08, 21.13, 21.16, 97
See application file for complete search history.

(56) References Cited

U.S. PATENT DOCUMENTS

| 7,239,119 B2* | 7/2007 | Baurle ............. H02M 3/33507 323/284 |
| 8,014,176 B2* | 9/2011 | Melanson ................ H01F 3/10 363/21.02 |
| 2009/0010027 A1 | 1/2009 | Nishikawa |
| 2012/0099344 A1* | 4/2012 | Adragna ............ H02M 3/3372 363/21.03 |

(Continued)

FOREIGN PATENT DOCUMENTS

| JP | 2009-017629 A | 1/2009 |
| JP | 2013-038857 A | 2/2013 |
| JP | 2016-111758 A | 6/2016 |

*Primary Examiner* — Jeffrey Sterrett
(74) *Attorney, Agent, or Firm* — Rabin & Berdo, P.C.

(57) ABSTRACT

Switching power supply apparatus having standby mode in which a burst operation is performed. High- and low-side switching elements are series connected across a DC input voltage. A resonant circuit is connected across one of the switching elements. A controller that on-off controls the high-side switching element includes a peak power limiting circuit that monitors input power and outputs a forced turn-off signal upon detecting input power exceeding a determined value. A triangular wave voltage is generated during portions of the burst operation in which a switching frequency of the switching elements is gradually decreased or increased. An oscillation circuit receives the forced turn-off signal from the power limiting circuit, and the triangular wave voltage to generate an on-trigger and off-trigger signals at a switching frequency corresponding to a triangular wave voltage value, and output the off-trigger signal upon receipt of the forced turn-off signal.

7 Claims, 14 Drawing Sheets

(56) References Cited

U.S. PATENT DOCUMENTS

| | | | |
|---|---|---|---|
| 2012/0113689 A1* | 5/2012 | Chen | H02M 3/33523 363/21.17 |
| 2012/0250360 A1* | 10/2012 | Orr | H02M 3/3376 363/21.02 |
| 2013/0128623 A1* | 5/2013 | Hosotani | H02M 3/33523 363/21.01 |
| 2015/0263629 A1* | 9/2015 | Stuler | H02M 3/33546 363/21.02 |
| 2016/0065075 A1* | 3/2016 | Sugahara | H02M 1/4225 363/21.02 |
| 2016/0141951 A1* | 5/2016 | Mao | H02M 1/36 363/21.02 |
| 2016/0164425 A1 | 6/2016 | Chen | |
| 2016/0294273 A1* | 10/2016 | Kawamura | H02M 3/33523 |
| 2017/0155333 A1* | 6/2017 | Chen | H02M 1/08 |
| 2017/0222565 A1* | 8/2017 | Sonobe | H02M 3/33507 |

* cited by examiner

SWITCHING POWER SUPPLY WITH BURST OPERATION IN STANDBY MODE

CROSS-REFERENCE TO RELATED APPLICATION

This application is based upon and claims the benefit of priority of the prior Japanese Patent Application No. 2016-125702, filed on Jun. 24, 2016, the entire contents of which are incorporated herein by reference.

BACKGROUND OF THE INVENTION

1. Field of the Invention

The embodiments discussed herein are related to a switching power supply apparatus.

2. Background of the Related Art

Because switching power supply apparatus including current resonance DC-DC converters are suitable for increasing efficiency or reducing thickness, they are widely adopted in liquid crystal televisions, AC-DC adapters, and the like. In particular, in order to accommodate recent global warming countermeasures, switching power supply apparatus including current resonance DC-DC converters are developed for the purpose of reducing power consumed at the time of electric apparatus not being used. These switching power supply apparatus have a standby mode to reduce power consumption.

In order to further reduce the power consumption of a switching power supply apparatus, performing burst operation (repeating intermittent (discontinuous) oscillation operation) in a standby mode is proposed. With the burst operation, switching is performed for a certain period, then switching is stopped for a certain period (see, for example, Japanese Laid-open Patent Publication No. 2013-038857). With the burst operation a switching pause period is set. This considerably reduces the average standby power at standby mode time of a switching power supply apparatus. Furthermore, with the switching power supply apparatus according to, for example, Japanese Laid-open Patent Publication No. 2013-038857, soft start operation is performed when switching is begun in the burst operation in the standby mode. The soft start operation is as follows. After switching is begun, a switching frequency gradually decreases with the elapse of time and converges to a certain value. As a switching frequency decreases by the soft start operation, a resonance current of a resonance circuit gradually increases and the amount of energy supplied from a primary side to a secondary side of a transformer gradually increases.

With the switching power supply apparatus according to, for example, Japanese Laid-open Patent Publication No. 2013-038857, the soft start operation is performed when switching is begun in switching operation of the burst operation. However, switching is stopped instantaneously at switching stop time. A switching frequency does not decrease to an audible frequency band in a normal mode other than the standby mode. Accordingly, the problem of a sound produced by the transformer does not arise. However, when switching is stopped in the standby mode, a sound which depends on a resonance current at the time of switching operation being stopped is produced. That is to say, when switching is suddenly stopped, a transient phenomenon in which a resonance current suddenly decreases occurs. An audible noise frequency component appears in a current flowing through the resonance circuit because of this transient phenomenon. As a resonance current at the time of switching operation being stopped increases, this audible noise frequency component increases. As a result, a sound becomes louder.

Performing soft start operation and soft end operation during a switching period in burst operation in a standby mode is proposed as a measure against a sound (see, for example, Japanese Laid-open Patent Publication No. 2009-017629 (FIG. 6)). A switching power supply apparatus according to Japanese Laid-open Patent Publication No. 2009-017629 is not of a current resonance type and exercises pulse width modulation (PWM) control with a switching frequency fixed. However, the concept of a reduction in sound is the same. The soft end operation is as follows. On-time ratio, which is the ratio of on-time to a switching cycle of a switching element, is gradually decreased with the elapse of time to decrease the amount of energy to be transmitted from a primary side to a transformer. A current flowing into the transformer is gradually decreased by the soft end operation. This prevents the transformer from producing a sound at switching stop time in the burst operation.

With the soft start operation and the soft end operation disclosed in, for example, Japanese Laid-open Patent Publication No. 2009-017629, a signal for pulse width control in PWM is received and a capacitor is charged and discharged with a constant current. By doing so, a triangular wave having a long cycle is generated. The triangular wave and a carrier signal outputted from an oscillator are compared to gradually increase or decrease on-time ratio.

The soft start operation and the soft end operation are also known for a switching power supply apparatus including a current resonance DC-DC converter which controls an output by changing a switching frequency.

With a current resonance DC-DC converter a soft start and a soft end in burst operation are performed by making the slope of a triangular wave for frequency control gentle (as a voltage of the triangular wave increases, a frequency becomes lower). In this case, a period for which the triangular wave is changing is long. As a result, with a current resonance switching power supply apparatus an ineffective switching region increases. The ineffective switching region is a region in which though switching operation is performed, energy is not transmitted from a primary side to a secondary side of a transformer. Therefore, it is desirable that the ineffective switching region be as small as possible for improving efficiency.

A remedy for a reduction in ineffective switching region is proposed by the present applicant (Japanese Patent Application No. 2014-244972). An ineffective switching region is more apt to arise at soft end time than at soft start time. In view of this respect, the slope of a triangular wave for frequency control during a soft end period is made greater than that of a triangular wave for frequency control during a soft start period to the limit where a produced sound is allowable. This shortens a period for which an ineffective switching region exists, and improves the efficiency of a switching power supply apparatus.

However, if the slope of a triangular wave for frequency control during a soft end period is made too great in order to shorten a period for which an ineffective switching region exists, then the peak value of a resonance current becomes large. As a result, audible noise increases. That is to say, with a current resonance switching power supply apparatus control is exercised so that as a triangular wave becomes higher, a switching frequency will become lower and so that as a triangular wave becomes lower, a switching frequency will become higher. There is an ineffective switching region in a portion of a triangular wave which is lower than a determined value, that is to say, in the early part of a soft start period or the latter part of a soft end period. Furthermore, voltage gain is high in a portion near the peak of a triangular wave. Energy is transmitted from a primary side to a secondary side of a transformer in the portion in which voltage gain is high. If after entrance into the portion in which energy is transmitted, the triangular wave becomes higher and the switching frequency becomes lower, the amount of transmitted energy rapidly increases. If the slope of the triangular wave becomes greater in this portion, then feedback for switching the triangular wave from increase to decrease is delayed and the triangular wave overshoots. As a result, the switching frequency becomes lower than is needed. Accordingly, the amount of energy transmitted from the primary side to the secondary side of the transformer is too large.

In burst operation at the time of a standby mode, a period for which switching is stopped is made longer as a load becomes lighter. However, if this period is long, the frequency of the burst operation itself may fall within an audible frequency range. Even in this case, audible noise does not attain a level recognized by a person if the peak value of a resonance current is somewhat small. However, if a triangular wave overshoots in the above way and the peak value of a resonance current exceeds a determined level, then a person comes to recognize audible noise.

This is the reason why audible noise increases when the slope of a triangular wave becomes great. Therefore, there is a trade-off relationship between efficiency (reduction in period for which an ineffective switching region exists) and audible noise.

SUMMARY OF THE INVENTION

According to an aspect, there is provided a switching power supply apparatus including a first high-side switching element and a second low-side switching element which are connected in series and across which a DC input voltage is applied, a circuit including a resonance reactor and a resonance capacitor connected in series, the circuit being connected in parallel with the first switching element or the second switching element, and a controller which alternately on-off controls the first switching element and the second switching element, the controller including a peak power limiting circuit which monitors an input power and which outputs a forced turn-off signal when the input power exceeds a determined value, a charge and discharge circuit which generates a triangular wave voltage during a soft start period and a soft end period in burst operation in a standby mode, and an oscillation circuit which receives the triangular wave voltage to generate an on-trigger signal and an off-trigger signal at a switching frequency corresponding to a value of the triangular wave voltage and which outputs, when receiving the forced turn-off signal from the peak power limiting circuit, the off-trigger signal at a timing at which the oscillation circuit receives the forced turn-off signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Embodiments will now be described in detail with reference to the accompanying drawings. A plurality of embodiments may partially be combined in a range in which there is no inconsistency.

First Embodiment

Figure 1:
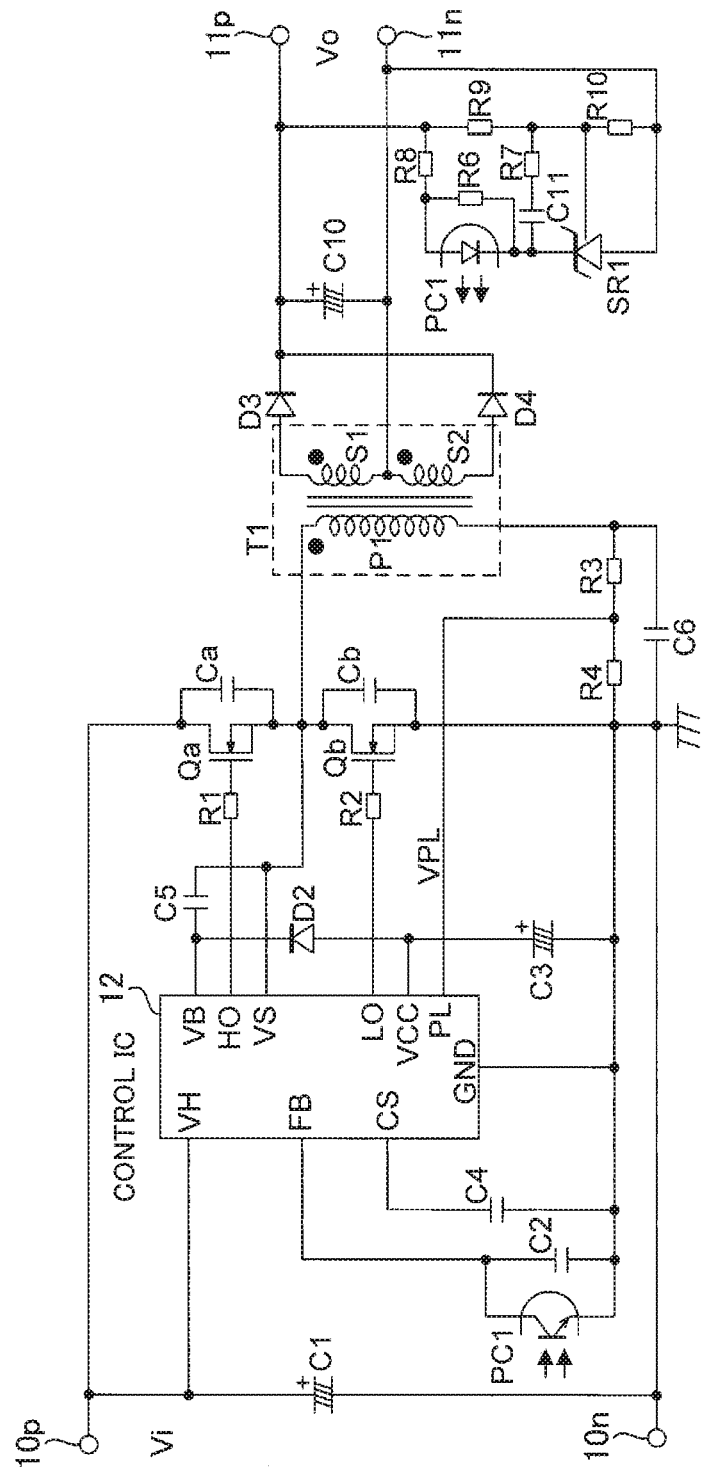
FIG. 1 is a circuit diagram illustrative of an example of the structure of a switching power supply apparatus including a current resonance DC-DC converter, according to a first embodiment.
Figure 2:
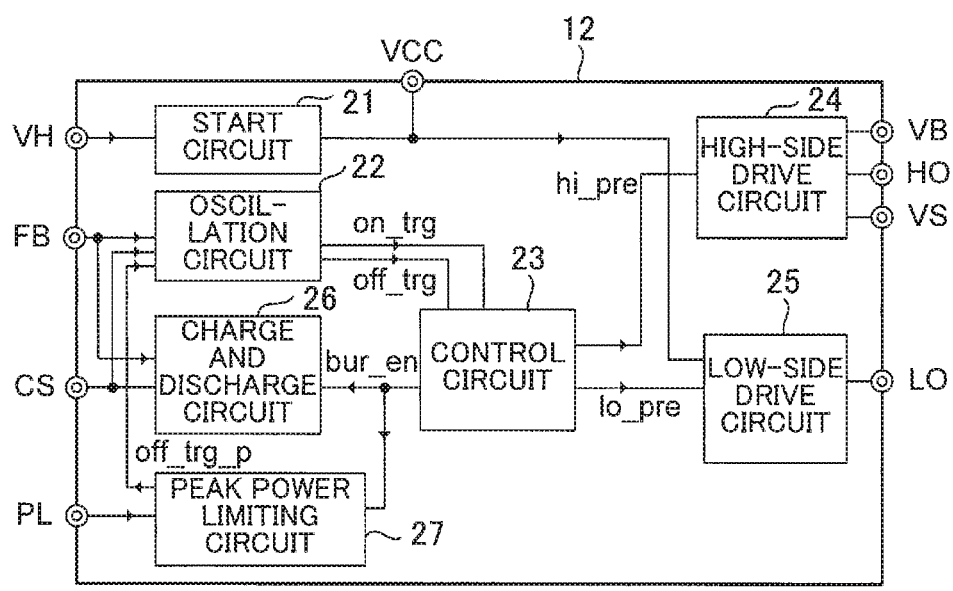
FIG. 2 illustrates an example of the structure of a control IC.

FIG. 1 is a circuit diagram illustrative of an example of the structure of a switching power supply apparatus including a current resonance DC-DC converter, according to a first embodiment. FIG. 2 illustrates an example of the structure of a control IC.

With a switching power supply apparatus according to a first embodiment an input capacitor C1 is connected to input terminals 10$p$ and 10$n$. An input DC voltage Vi is applied to the input capacitor C1. For example, the input voltage Vi is a constant high DC voltage generated by a power factor correction circuit. Furthermore, a circuit including a high-side switching element Qa and a low-side switching element Qb connected in series is connected to the input terminals 10$p$ and 10$n$ to make up a half bridge circuit. In the example of FIG. 1, n-channel metal-oxide-semiconductor field-effect transistors (MOSFETs) are used as the switching elements Qa and Qb. In addition, the switching element Qa and a capacitor Ca are connected in parallel and the switching element Qb and a capacitor Cb are connected in parallel. The capacitance of the capacitor Ca is mainly parasitic capacitance between a drain terminal and a source terminal of the switching element Qa and the capacitance of the capacitor Cb is mainly parasitic capacitance between a drain terminal and a source terminal of the switching element Qb.

A common connection point of the switching elements Qa and Qb is connected to one terminal of a primary winding P1 of a transformer T1 and the other terminal of the primary winding P1 is connected to a ground via a resonance capacitor C6. A leakage inductance component between the primary winding P1 and secondary windings S1 and S2 of the transformer T1 and the resonance capacitor C6 make up a resonance circuit. The leakage inductance may not be used. That is to say, an inductance other than the inductance included in the transformer T1 may be connected in series with the resonance capacitor C6 and be used as a resonance reactance of a resonance circuit.

One terminal of the secondary winding S1 of the transformer T1 is connected to an anode terminal of a diode D3. One terminal of the secondary winding S2 of the transformer T1 is connected to an anode terminal of a diode D4. Cathode terminals of the diodes D3 and D4 are connected to a positive electrode terminal of an output capacitor C10 and an output terminal 11p. A negative electrode terminal of the output capacitor C10 is connected to a common connection point of the secondary windings S1 and S2 and an output terminal 11n. The secondary windings S1 and S2, the diodes D3 and D4, and the output capacitor C10 make up a circuit which rectifies and smooths an AC voltage generated in the secondary windings S1 and S2 and which converts it to an output DC voltage Vo. This circuit is an output circuit of the switching power supply apparatus.

The positive electrode terminal of the output capacitor C10 is connected via a resistor R8 to an anode terminal of a light-emitting diode of a photocoupler PC1. A cathode terminal of the light-emitting diode is connected to a cathode terminal of a shunt regulator SR1. A resistor S6 is connected between the anode terminal and the cathode terminal of the light-emitting diode. An anode terminal of the shunt regulator SR1 is connected to the output terminal 11n. The shunt regulator SR1 has a reference terminal connected to a connection point of resistors R9 and R10 connected in series between the positive electrode terminal and the negative electrode terminal of the output capacitor C10. A circuit made up of a resistor R7 and a capacitor C11 connected in series is connected between the reference terminal and the cathode terminal of the shunt regulator SR1. The shunt regulator SR1 causes a current corresponding to the difference between a voltage obtained by dividing an output voltage Vo (voltage across the output capacitor C10) and an internal reference voltage to flow to the light-emitting diode of the photocoupler PC1. A collector terminal of a phototransistor of the photocoupler PC1 is connected to an FB terminal of a control integrated circuit (IC) 12. An emitter terminal of the phototransistor is connected to the ground. A capacitor C2 is connected between the collector terminal and the emitter terminal of the phototransistor.

The control IC 12 is a controller which controls the switching power supply apparatus. The control IC 12 has a VH terminal connected to a positive electrode terminal of the input capacitor C1 and a GND terminal connected to the ground. Furthermore, the control IC 12 has an HO terminal connected via a resistor R1 to a gate terminal of the switching element Qa and an LO terminal connected via a resistor R2 to a gate terminal of the switching element Qb. In addition, the control IC 12 has a CS terminal, a VB terminal, a VS terminal, a VCC terminal, and a PL terminal.

A capacitor C5 is connected between the VB terminal and the VS terminal. The VS terminal is connected to the common connection point of the switching elements Qa and Qb. The VCC terminal is connected to a positive electrode terminal of a capacitor C3 and a negative electrode terminal of the capacitor C3 is connected to the ground. Furthermore, the VCC terminal is connected to an anode terminal of a diode D2 and a cathode terminal of the diode D2 is connected to the VB terminal. The VCC terminal is connected via a diode to an auxiliary winding of the transformer T1 (not illustrated for the sake of the simplicity of FIG. 1). After the switching power supply apparatus is started, a current induced in the auxiliary winding is stored in the capacitor C3 and is used as a power source for the control IC 12. A capacitor C4 charged and discharged for forming a triangular wave is connected to the CS terminal. The PL terminal is connected to a common connection point of resistors R3 and R4 connected in series. The resistors R3 and R4 connected in series and a resonance capacitor C6 are connected in parallel. As a result, a voltage obtained by dividing a voltage across the resonance capacitor C6 is supplied to the PL terminal as a signal indicative of power.

As illustrated in FIG. 2, the control IC 12 includes a start circuit 21 whose input terminal is connected to the VH terminal. An output terminal of the start circuit 21 is connected to the VCC terminal. The FB terminal and the CS terminal are connected to an input terminal of an oscillation circuit 22. An output terminal of the oscillation circuit 22 is connected to a control circuit 23 to supply an on-trigger signal on_trg and an off-trigger signal off_trg to the control circuit 23. The FB terminal is pulled up via a resistor (not illustrated) to a reference voltage (not illustrated). A high-side output terminal of the control circuit 23 is connected to an input terminal of a high-side drive circuit 24 to supply a high-side drive signal hi_pre thereto. A low-side output terminal of the control circuit 23 is connected to an input terminal of a low-side drive circuit 25 to supply a low-side drive signal lo_pre thereto. An output terminal of the high-side drive circuit 24 is connected to the HO terminal and an output terminal of the low-side drive circuit 25 is connected to the LO terminal. The high-side drive circuit 24 is also connected to the VB terminal for a high-side power source and the VS terminal which is a high-side reference potential. The low-side drive circuit 25 is also connected to the VCC terminal.

The FB terminal is also connected to an input terminal of a charge and discharge circuit 26. Furthermore, the charge and discharge circuit 26 is connected to the control circuit 23 to receive a burst operation signal bur_en therefrom. An output terminal of the charge and discharge circuit 26 is connected to the CS terminal and the input terminal of the oscillation circuit 22. The PL terminal is connected to an input terminal of a peak power limiting circuit 27. Furthermore, the peak power limiting circuit 27 is connected to the control circuit 23 to receive the burst operation signal bur_en therefrom. An output terminal of the peak power limiting circuit 27 is connected to the input terminal of the oscillation circuit 22 to supply a forced turn-off signal off_trg_p thereto.

A concrete example of the structure of each of the oscillation circuit 22, the charge and discharge circuit 26, and the peak power limiting circuit 27 included in the control IC 12 will now be described.

Figure 3:
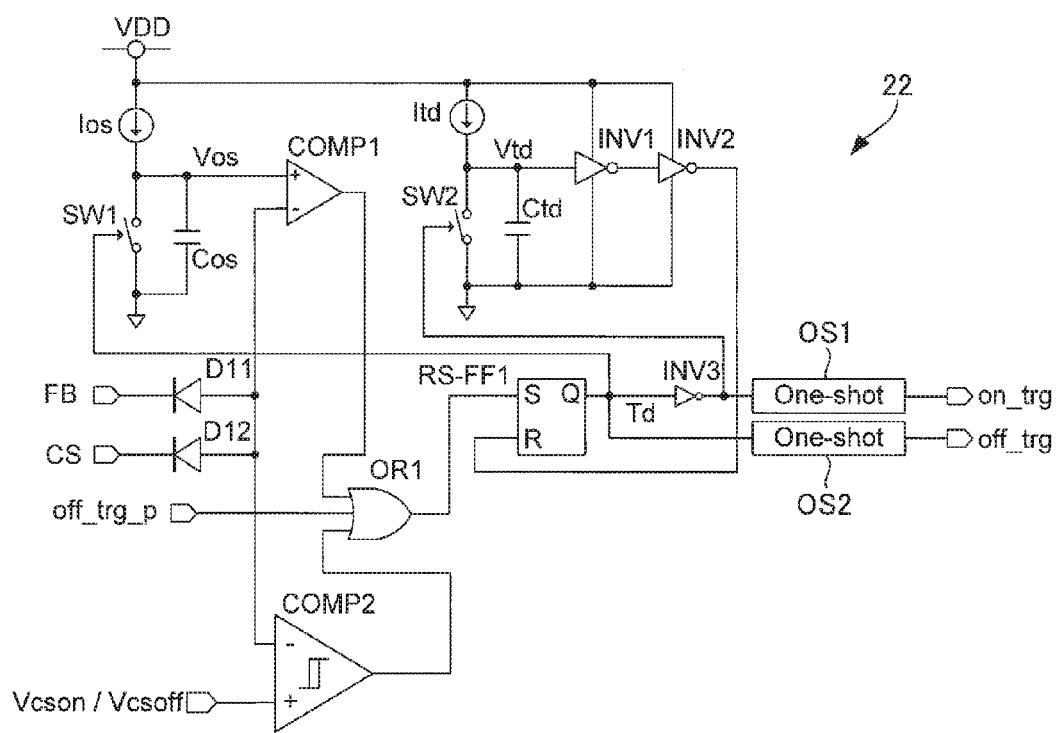
FIG. 3 is a circuit diagram illustrative of an example of the structure of an oscillation circuit.
Figure 4:
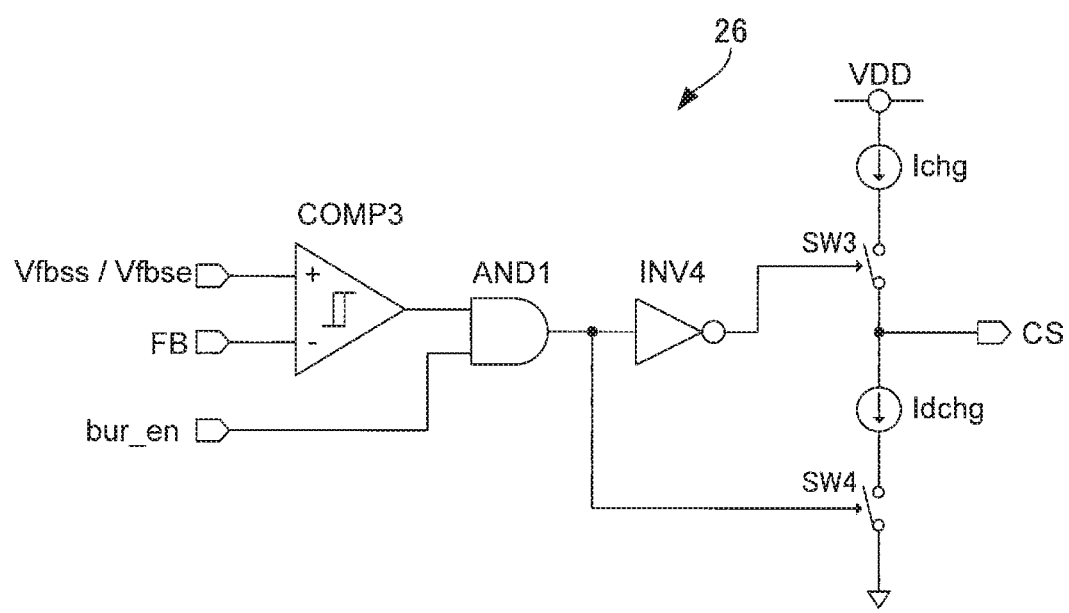
FIG. 4 is a circuit diagram illustrative of an example of the structure of a charge and discharge circuit.
Figure 5:
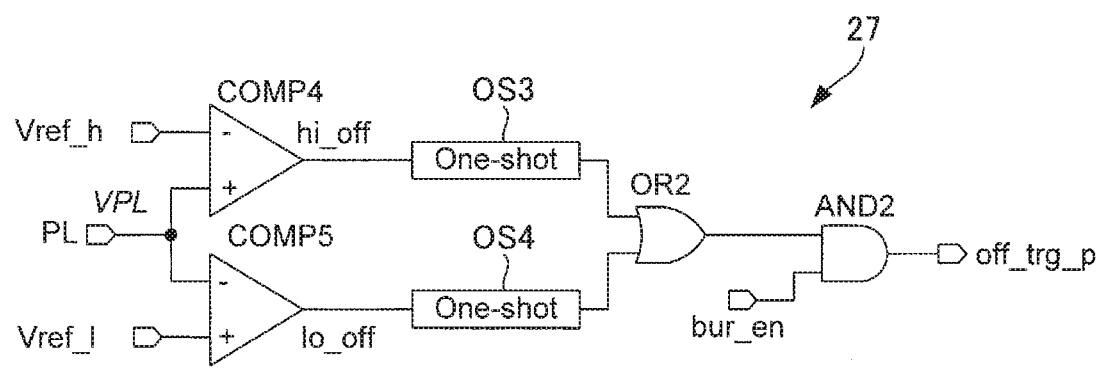
FIG. 5 is a circuit diagram illustrative of an example of the structure of a peak power limiting circuit.

FIG. 3 is a circuit diagram illustrative of an example of the structure of the oscillation circuit. FIG. 4 is a circuit diagram illustrative of an example of the structure of the charge and discharge circuit. FIG. 5 is a circuit diagram illustrative of an example of the structure of the peak power limiting circuit.

As illustrated in FIG. 3, the oscillation circuit includes diodes D11 and D12 whose cathode terminals are connected to the FB terminal and the CS terminal respectively. Both of anode terminals of the diodes D11 and D12 are connected to an inverting input terminal of a comparator COMP1 and an inverting input terminal of a hysteresis comparator COMP2. A non-inverting input terminal of the comparator COMP1 is connected to a connection point of one terminal of a constant-current source Ios and one terminal of a capacitor Cos. A non-inverting input terminal of the hysteresis comparator COMP2 is connected to a terminal which receives a threshold voltage Vcson or Vcsoff generated inside the control IC 12. The other terminal of the constant-current source Ios is connected to a power source VDD. The other terminal of the capacitor Cos is connected to the ground. The capacitor Cos and a switch SW1 are connected in parallel.

An output terminal of the comparator COMP1 is connected to a first input terminal of an OR circuit OR1. A second input terminal of the OR circuit OR1 is connected to a terminal which receives a forced turn-off signal off_trg_p from the peak power limiting circuit 27. A third input terminal of the OR circuit OR1 is connected to an output terminal of the hysteresis comparator COMP2. An output terminal of the OR circuit OR1 is connected to a set input terminal S of an RS flip-flop RS-FF1.

An output terminal Q of the RS flip-flop RS-FF1 is connected to a control input terminal of the switch SW1, an input terminal of an inverter circuit INV3, and an input terminal of a one-shot circuit OS2. An output terminal of the inverter circuit INV3 is connected to the input terminal of a one-shot circuit OS1. An output terminal of the one-shot circuit OS1 is a terminal which outputs an on-trigger signal on_trg of the oscillation circuit 22. An output terminal of the one-shot circuit OS2 is a terminal which outputs an off-trigger signal off_trg of the oscillation circuit 22.

The output terminal of the inverter circuit INV3 is also connected to a control input terminal of a switch SW2. One terminal of the switch SW2 is connected to one terminal of a constant-current source Itd, one terminal of a capacitor Ctd, and an input terminal of an inverter circuit INV1. The other terminal of the constant-current source Itd is connected to the power source VDD. The other terminal of the capacitor Ctd is connected to the ground. An output terminal of the inverter circuit INV1 is connected to an input terminal of an inverter circuit INV2. An output terminal of the inverter circuit INV2 is connected to a reset input terminal R of the RS flip-flop RS-FF1.

As illustrated in FIG. 4, the charge and discharge circuit 26 connected to the CS terminal of the oscillation circuit 22 includes a hysteresis comparator COMP3. An inverting input terminal of the hysteresis comparator COMP3 is connected to the FB terminal of the control IC 12 and a non-inverting input terminal of the hysteresis comparator COMP3 is connected to a terminal which receives a threshold voltage Vfbss or Vfbse generated inside the control IC 12. An output terminal of the hysteresis comparator COMP3 is connected to one input terminal of an AND circuit AND1. The other input terminal of the AND circuit AND1 is connected to a terminal which receives a burst operation signal bur_en from the control circuit 23. An output terminal of the AND circuit AND1 is connected via an inverter circuit INV4 to a control input terminal of a switch SW3. One terminal of the switch SW3 is connected to one terminal of a constant-current source Ichg. The other terminal of the constant-current source Ichg is connected to the power source VDD. The other terminal of the switch SW3 is connected to the CS terminal and one terminal of a constant-current source Idchg. The other terminal of the constant-current source Idchg is connected via a switch SW4 to the ground. A control input terminal of the switch SW4 is connected to the output terminal of the AND circuit AND1. The constant-current source Ichg determines the slope of a triangular wave at soft start time. The constant-current source Idchg determines the slope of a triangular wave at soft end time.

As illustrated in FIG. 5, the peak power limiting circuit 27 connected to a terminal of the oscillation circuit 22 which receives a forced turn-off signal off_trg_p includes two comparators COMP4 and COMP5. An inverting input terminal of the comparator COMP4 is connected to a terminal which receives a threshold voltage Vref_h generated inside the control IC 12. A non-inverting input terminal of the comparator COMP5 is connected to a terminal which receives a threshold voltage Vref_l generated inside the control IC 12. A non-inverting input terminal of the comparator COMP4 and an inverting input terminal of the comparator COMP5 are connected to the PL terminal of the control IC 12. An output terminal of the comparator COMP4 is connected via a one-shot circuit OS3 to one input terminal of an OR circuit OR2. An output terminal of the comparator COMP5 is connected via a one-shot circuit OS4 to the other input terminal of the OR circuit OR2. An output terminal of the OR circuit OR2 is connected to one input terminal of an AND circuit AND2. The other input terminal of the AND circuit AND2 is connected to a terminal which receives a burst operation signal bur_en from the control circuit 23. An output terminal of the AND circuit AND2 is connected to a terminal which supplies the forced turn-off signal off_trg_p to the oscillation circuit 22.

The threshold voltage Vref_h and the threshold voltage Vref_l of the peak power limiting circuit 27 are determined by:

$$Vref\_h=(Vi/2+\Delta Vcr/2)*R4/(R3+R4)$$

$$Vref\_l=(Vi/2-\Delta Vcr/2)*R4/(R3+R4)$$

where ΔVcr is the maximum permissible value of a voltage Vcr of the resonance capacitor C6.

The operation of the current resonance switching power supply apparatus having the above structure will be described.

Figure 6:
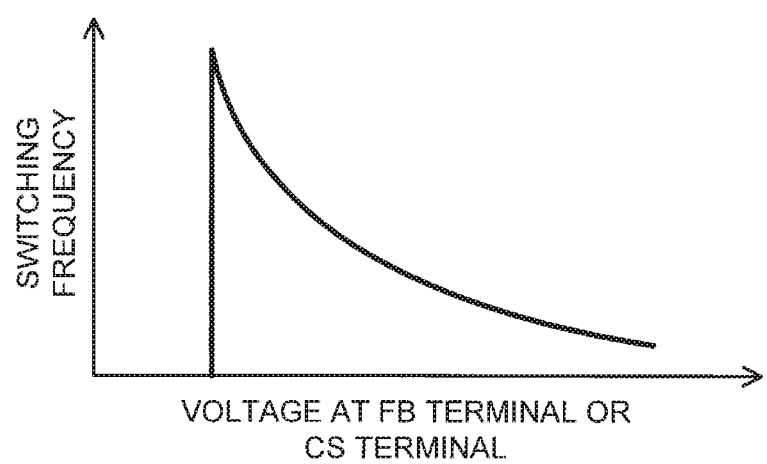
FIG. 6 illustrates the relationship between a voltage at an FB terminal or a CS terminal of the oscillation circuit and a switching frequency.
Figure 7:
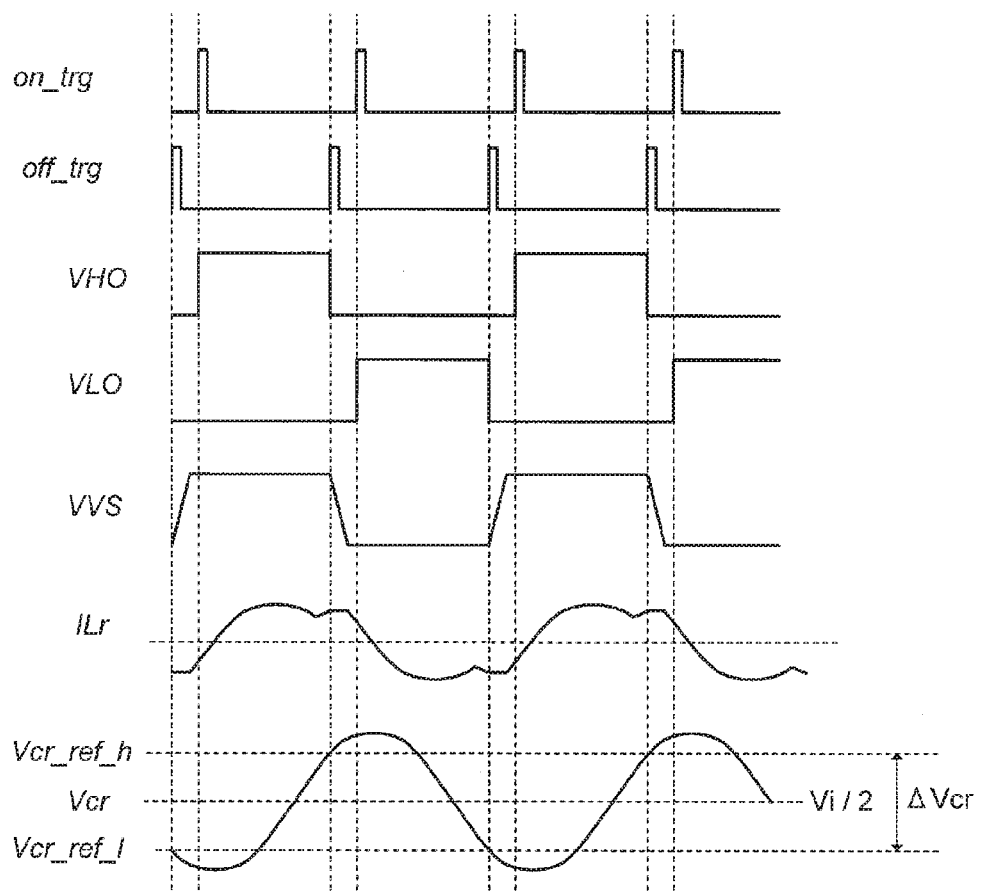
FIG. 7 illustrates the operation sequence of the current resonance switching power supply apparatus.
Figure 8:
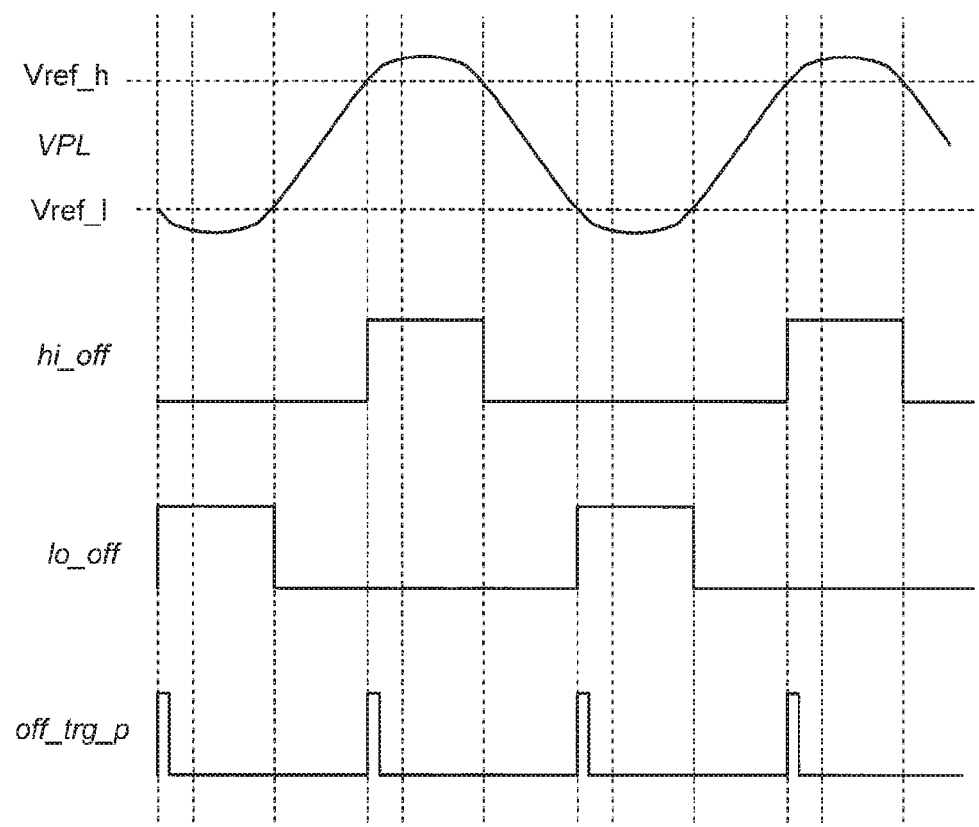
FIG. 8 illustrates the operation sequence of the peak power limiting circuit.
Figure 9:
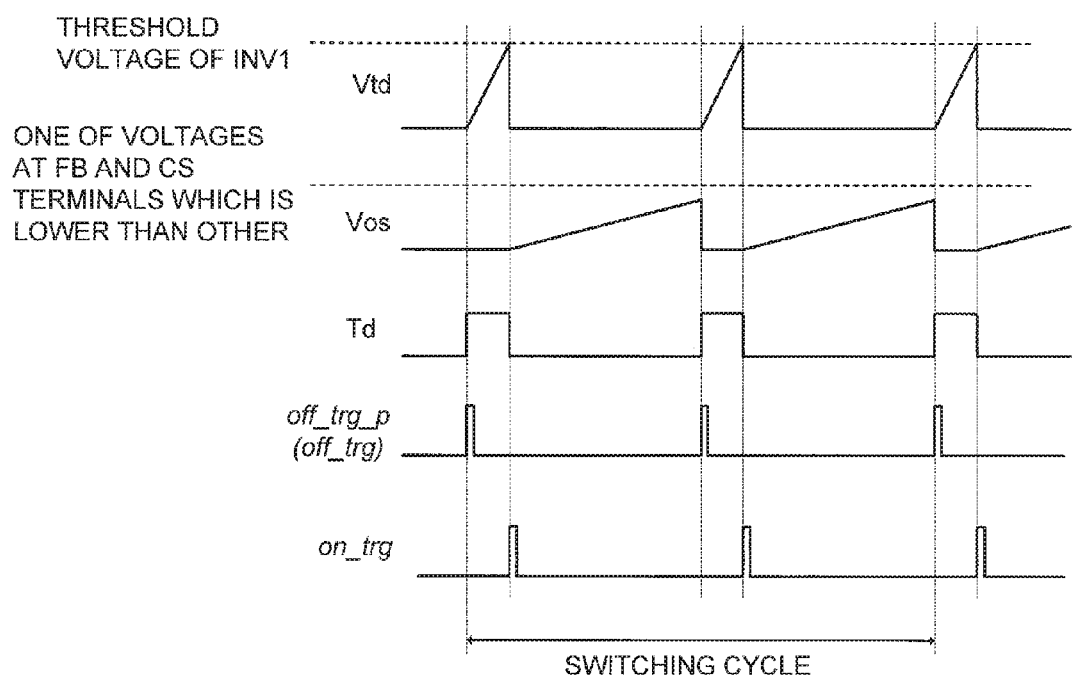
FIG. 9 illustrates the operation sequence of the oscillation circuit.

FIG. 6 illustrates the relationship between a voltage at the FB terminal or the CS terminal of the oscillation circuit and a switching frequency. FIG. 7 illustrates the operation sequence of the current resonance switching power supply apparatus. FIG. 8 illustrates the operation sequence of the peak power limiting circuit. FIG. 9 illustrates the operation sequence of the oscillation circuit.

First when the switching power supply apparatus operates in a normal mode, the control circuit 23 outputs a low(L)-level burst operation signal bur_en. As a result, an output of the AND circuit AND1 is fixed at an L level in the charge and discharge circuit 26. Accordingly, the high-side switch SW3 is in a conducting state and the low-side switch SW4 is in a cutoff state. As a result, the capacitor C4 connected to the CS terminal is continuously charged with a charging current from the constant-current source Ichg and a voltage at the CS terminal is kept at a high value.

At this time a switching frequency is determined in the oscillation circuit 22 according to one of a voltage value at the FB terminal and a voltage value at the CS terminal which is smaller than the other. That is to say, as illustrated in FIG. 6, a switching frequency is maximized when a voltage at the FB terminal or the CS terminal is a value (threshold voltage Vcson/Vcsoff). After a voltage at the FB terminal or the CS terminal exceeds the threshold voltage Vcson/Vcsoff, a switching frequency decreases with an increase in the voltage. With a current resonance DC-DC converter voltage gain (output voltage Vo/input voltage Vi) depends on a switching frequency. In a switching frequency range illustrated in FIG. 6, voltage gain increases with a decrease in switching frequency.

In this case, a voltage signal having a high voltage value is received at the CS terminal. Accordingly, a switching frequency is determined in the oscillation circuit 22 by a feedback signal received at the FB terminal. That is to say, the oscillation circuit 22 is frequency-controlled by a feedback signal and outputs an on-trigger signal on_trg and an off-trigger signal off_trg illustrated in FIG. 7. The control circuit 23 which receives the on-trigger signal on_trg and the off-trigger signal off_trg supplies a high-side drive signal hi_pre to the high-side drive circuit 24 and supplies a low-side drive signal lo_pre to the low-side drive circuit 25. As a result, the high-side drive circuit outputs a signal VHO illustrated in FIG. 7 to the HO terminal to on-off control the switching element Qa. The low-side drive circuit 25 outputs a signal VLO illustrated in FIG. 7 to the LO terminal to on-off control the switching element Qb. The on-trigger signal on_trg and the off-trigger signal off_trg are used for determining timing at which the switching elements Qa and Qb are turned on and off alternately. For example, timing at which the switching element Qa is turned on is determined by an even-numbered on-trigger signal on_trg and timing at which the switching element Qb is turned on is determined by an odd-numbered on-trigger signal on_trg. Furthermore, timing at which a switching element which is on is turned off is determined by the off-trigger signal off_trg. As illustrated in FIG. 7, when the high-side switching element Qa is on and the low-side switching element Qb is turned off, a potential VVS at the common connection point of the switching elements Qa and Qb rises to the input voltage Vi. Furthermore, when the high-side switching element Qa is off and the low-side switching element Qb is turned on, the potential VVS falls to the ground level. By on-off controlling the switching elements Qa and Qb, a resonance current of the resonance circuit is controlled. A current ILr illustrated in FIG. 7 flows through the primary winding P1 of the transformer T1 and a resonance current also flows to the resonance capacitor C6. As a result, a voltage Vcr illustrated in FIG. 7 is generated across the resonance capacitor C6.

The voltage Vcr illustrated in FIG. 7 also indicates the operating principle of the peak power limiting circuit 27. That is to say, the waveform of the voltage Vcr indicates that the voltage Vcr rises and falls by the switching operation of the switching elements Qa and Qb with a voltage corresponding to half of the input voltage Vi as a center. The peak power limiting circuit 27 sets a determined threshold voltage Vcr_ref_h on a high potential side and sets a determined threshold voltage Vcr_ref_l on a low potential side to limit power at the time of resonance operation in a standby mode to a difference ΔVcr between the threshold voltages. As a result, a peak power portion of the voltage Vcr of the resonance capacitor C6 which becomes higher than the threshold voltage Vcr_ref_h at the time of the high-side switching element Qa being turned on is limited. Furthermore, a peak power portion of the voltage Vcr which becomes lower than the threshold voltage Vcr_ref_l at the time of the low-side switching element Qb being turned on is limited.

To be concrete, input power Pin of the current resonance switching power supply apparatus is expressed as Pin=Vi*ΔVcr*Cr*fs+(Vi^2)*Cvs*fs where Vi is an input voltage, Cr is the capacitance of the resonance capacitor C6, fs is a switching frequency, and Cvs is an equivalent capacitance (≈Ca+Cb) between the VS terminal and the ground. In this expression for calculating the input power Pin, the parameters other than ΔVcr are approximately constant. As a result, the input power Pin is a function of the difference ΔVcr. Accordingly, if the difference ΔVcr is limited to a determined value, power is limited. Because peak power is limited in this way in the standby mode, audible noise is reduced considerably. In this case, peak power is limited by decreasing the difference ΔVcr. However, the value of the difference ΔVcr is determined by the fixed threshold voltages Vref_h and Vref_l set inside the control IC 12. However, the difference ΔVcr may arbitrarily be changed by adjusting voltage division ratio between the external resistors R3 and R4.

Burst operation in the standby mode will now be described. With burst operation in the standby mode the control circuit 23 outputs a high(H)-level burst operation signal bur_en. As a result, the charge and discharge circuit 26 enables charging and discharging operation and the peak power limiting circuit 27 enables outputting a forced turn-off signal off_trg_p.

A voltage VPL obtained by voltage division by the resistors R3 and R4 is inputted to the PL terminal of the peak power limiting circuit 27. The comparator COMP4 compares the threshold voltage Vref_h on the high potential side and the voltage VPL and the comparator COMP5 compares the threshold voltage Vref_l on the low potential side and the voltage VPL. As illustrated in FIG. 8, the high-side threshold voltage Vref_h corresponds to the threshold voltage Vcr_ref_h for the voltage Vcr before the voltage division and the low-side threshold voltage Vref_l corresponds to the threshold voltage Vcr_ref_l for the voltage Vcr before the voltage division.

When the voltage VPL exceeds the high-side threshold voltage Vref_h, the comparator COMP4 outputs an H-level signal hi_off. The one-shot circuit OS3 which receives the signal hi_off outputs a signal having a determined on-width and rising in synchronization with the rising edge of the signal hi_off. The signal outputted from the one-shot circuit OS3 is outputted via the OR circuit OR2 and the AND circuit AND2 to the output terminal of the peak power limiting circuit 27 as a forced turn-off signal off_trg_p.

On the other hand, when the voltage VPL falls below the low-side threshold voltage Vref_l, the comparator COMP5 outputs an H-level signal lo_off. The one-shot circuit OS4 which receives the signal lo_off outputs a signal having a determined on-width and rising in synchronization with the rising edge of the signal lo_off. The signal outputted from the one-shot circuit OS4 is outputted via the OR circuit OR2 and the AND circuit AND2 to the output terminal of the peak power limiting circuit 27 as a forced turn-off signal off_trg_p. The forced turn-off signal off_trg_p is supplied to the oscillation circuit 22.

In the normal mode an output of the hysteresis comparator COMP2 in the oscillation circuit 22 is at an L level. When a charging voltage Vos of the capacitor Cos exceeds one of a voltage at the FB terminal and a voltage at the CS terminal which is lower than the other, the RS flip-flop RS-FF1 is set and outputs an H-level signal Td. The signal Td is inputted to the one-shot circuit OS2. The one-shot circuit OS2 outputs an off-trigger signal off_trg having a determined on-width and rising in synchronization with the rising edge of the signal Td. At this time the switch SW1 is turned on (switch SW1 goes into a conducting state) by the H-level signal Td. Accordingly, electric charges stored in the capacitor Cos are discharged. Furthermore, because an output of the inverter circuit INV3 becomes an L level and the switch SW2 is turned off (switch SW2 goes into a cutoff state), a delay circuit including the inverter circuits INV1 and INV2 begins delay operation. When a charging voltage Vtd of the capacitor Ctd exceeds a threshold voltage of the inverter circuit INV1 in this delay circuit, the RS flip-flop RS-FF1 is reset and the signal Td becomes an L level. The signal Td is logic-inverted by the inverter circuit INV3 and is inputted to the one-shot circuit OS1. The one-shot circuit OS1 outputs an on-trigger signal on_trg having a determined on-width and rising in synchronization with the falling edge of the signal Td. At this time the delay circuit including the inverter circuits INV1 and INV2 ends the delay operation and a circuit including the comparator COMP1 begins to generate the reference charging voltage Vos.

On the other hand, with burst operation in the standby mode not only output signals of the comparator COMP1 and the hysteresis comparator COMP2 but also a forced turn-off signal off_trg_p from the peak power limiting circuit 27 is inputted to the set input terminal S of the RS flip-flop RS-FF1.

When the forced turn-off signal off_trg_p is inputted to the set input terminal S of the RS flip-flop RS-FF1, the RS flip-flop RS-FF1 is set and an H-level signal Td is outputted to the output terminal Q. As a result, as illustrated in FIG. 9, charging the capacitor Ctd is begun and a charging voltage Vtd begins to rise. Furthermore, the one-shot circuit OS2 outputs an off-trigger signal off_trg. At this time electric charges stored in the capacitor Cos are discharged.

When the charging voltage Vtd exceeds the threshold voltage of the inverter circuit INV1, the RS flip-flop RS-FF1 is reset and an L-level signal Td is outputted to the output terminal Q. As a result, the one-shot circuit OS1 outputs an on-trigger signal on_trg.

When the one-shot circuit OS1 outputs the on-trigger signal on_trg, the switch SW1 goes into a cutoff state and charging the capacitor Cos is begun. However, before a charging voltage Vos of the capacitor Cos exceeds one of a voltage at the FB terminal and a voltage at the CS terminal which is lower than the other, the forced turn-off signal off_trg_p is inputted. As a result, the switch SW1 goes into a conducting state and the capacitor Cos is discharged. Accordingly, the comparator COMP1 does not output a signal which provides a chance to generate an off-trigger signal off_trg.

The operation of the switching power supply apparatus performed in the burst operation in the standby mode will now be described.

Figure 10:
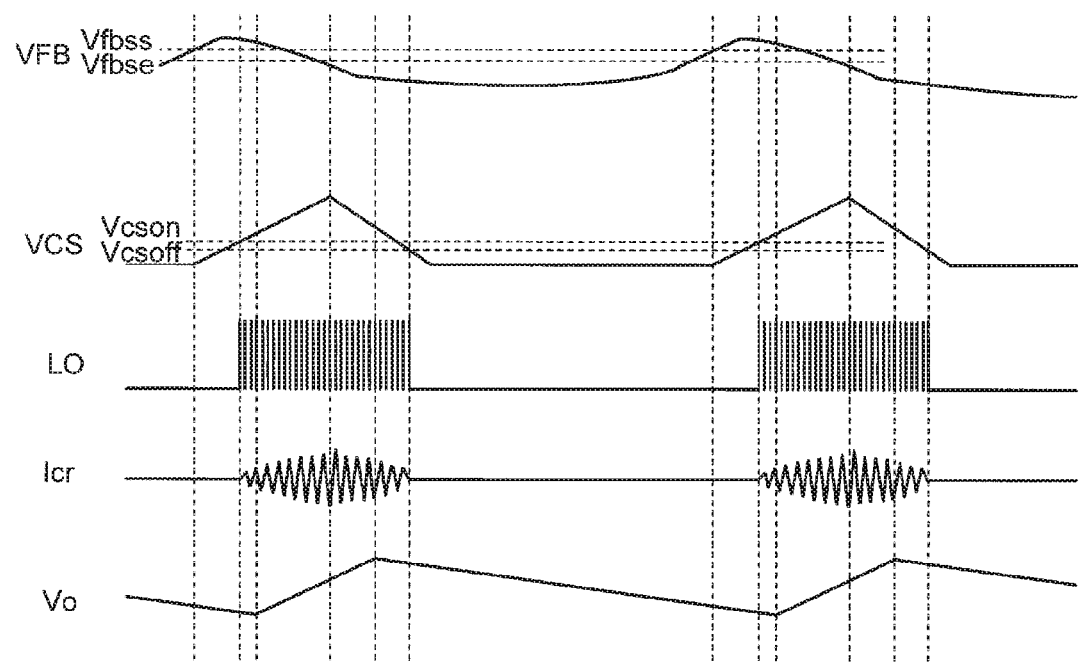
FIG. 10 illustrates operational waveforms in burst operation in a standby mode.

FIG. 10 illustrates operational waveforms in the burst operation in the standby mode.

With the burst operation in the standby mode the oscillation circuit 22 is frequency-controlled by a voltage VCS at the CS terminal. With a soft start control is exercised so that as the voltage VCS rises, a switching frequency of the oscillation circuit 22 will become lower. With a soft end control is exercised so that as the voltage VCS falls, a switching frequency of the oscillation circuit 22 will become higher.

A load is light in the standby mode. When switching of the switching elements Qa and Qb is performed in the standby mode, power which is more than the power consumption of the load is transmitted to an output side. As a result, a voltage VFB at the FB terminal falls. Accordingly, in the initial state of FIG. 10, the voltage VFB is lower than the threshold voltage Vfbse indicated in FIG. 4. As a result, in the charge and discharge circuit 26, the switch SW3 is off, the switch SW4 is on, and a potential at the CS terminal is a ground potential. Because switching of the switching elements Qa and Qb is stopped in this initial state, the voltage VFB at the FB terminal gradually increases. When the voltage VFB at the FB terminal exceeds the threshold voltage Vfbss, an output of the hysteresis comparator COMP3 becomes an L level, an output of the AND circuit AND1 becomes an L level, and an output of the inverter circuit INV4 becomes an H level. As a result, charging the capacitor C4 by the constant-current source Ichg is begun, the voltage VCS at the CS terminal begins to rise, and a soft start is begun.

If the voltage VCS at the CS terminal is lower at soft start time than the threshold voltage Vcson on the high potential side generated inside the control IC 12, an output of the hysteresis comparator COMP2 is at an H level and a set input is continuously applied to the RS flip-flop RS-FF1. Accordingly, an on-trigger signal on_trg is not outputted and switching of the switching elements Qa and Qb is stopped. When the voltage VCS at the CS terminal increases and exceeds the high-side threshold voltage Vcson generated inside the control IC 12, an output of the hysteresis comparator COMP2 becomes an L level. As a result, switching is begun. For example, a signal VLO for on-off controlling the switching element Qb is outputted to the low-side LO terminal. Accordingly, the resonance circuit begins resonance and a current Icr flows to the resonance capacitor C6. At this time a switching frequency is high at first. As a result, voltage gain is low and an ineffective switching region in which the amount of energy transmitted from the primary side to the secondary side is small or zero is entered. When the voltage VCS at the CS terminal rises further, the switching frequency becomes lower, voltage gain becomes higher, and the amount of energy transmitted from the primary side to the secondary side increases. Accordingly, an output voltage Vo gradually rises.

When switching of the switching elements Qa and Qb is begun and the amount of energy transmitted from the input side to the output side increases, the voltage VFB at the FB terminal falls. When the voltage VFB falls below the threshold voltage Vfbse, an output of the hysteresis comparator COMP3 becomes an H level, an output of the AND circuit AND1 becomes an H level, and an output of the inverter circuit INV4 becomes an L level. As a result, discharging the capacitor C4 by the constant-current source Idchg is begun and the voltage VCS at the CS terminal begins to fall. When the voltage VCS at the CS terminal becomes lower than the threshold voltage Vcsoff on the low potential side, an output of the hysteresis comparator COMP2 becomes an H level and switching of the switching elements Qa and Qb is stopped.

The voltage VCS at the CS terminal falls at soft end time. When the voltage VCS at the CS terminal falls below the high-side threshold voltage Vcsoff generated inside the control IC 12, an output of the hysteresis comparator COMP2 becomes an H level and switching is stopped. With the soft end a switching frequency increases. However, voltage gain decreases on the way and an ineffective switching region is entered.

In an effective region between the ineffective switching region of the soft start and the ineffective switching region of the soft end, the amount of energy transmitted from the primary side to the secondary side is large and the output voltage Vo gradually rises. Furthermore, if the amount of energy transmitted from the primary side to the secondary side is excessive in this effective region, then peak power is limited by the peak power limiting circuit 27. As a result, even if setting is performed for the purpose of reducing the ineffective switching regions so that the slope of the voltage VCS will become great, the peak value of the resonance current Icr of the resonance capacitor C6 is suppressed. By doing so, the generation of audible noise is suppressed.

The threshold voltages Vfbss and Vfbse are set so as to be higher than the voltage VCS at the CS terminal in the burst operation. Therefore, a switching frequency at burst operation time is controlled only by the voltage VCS at the CS terminal.

Second Embodiment

Figure 11:
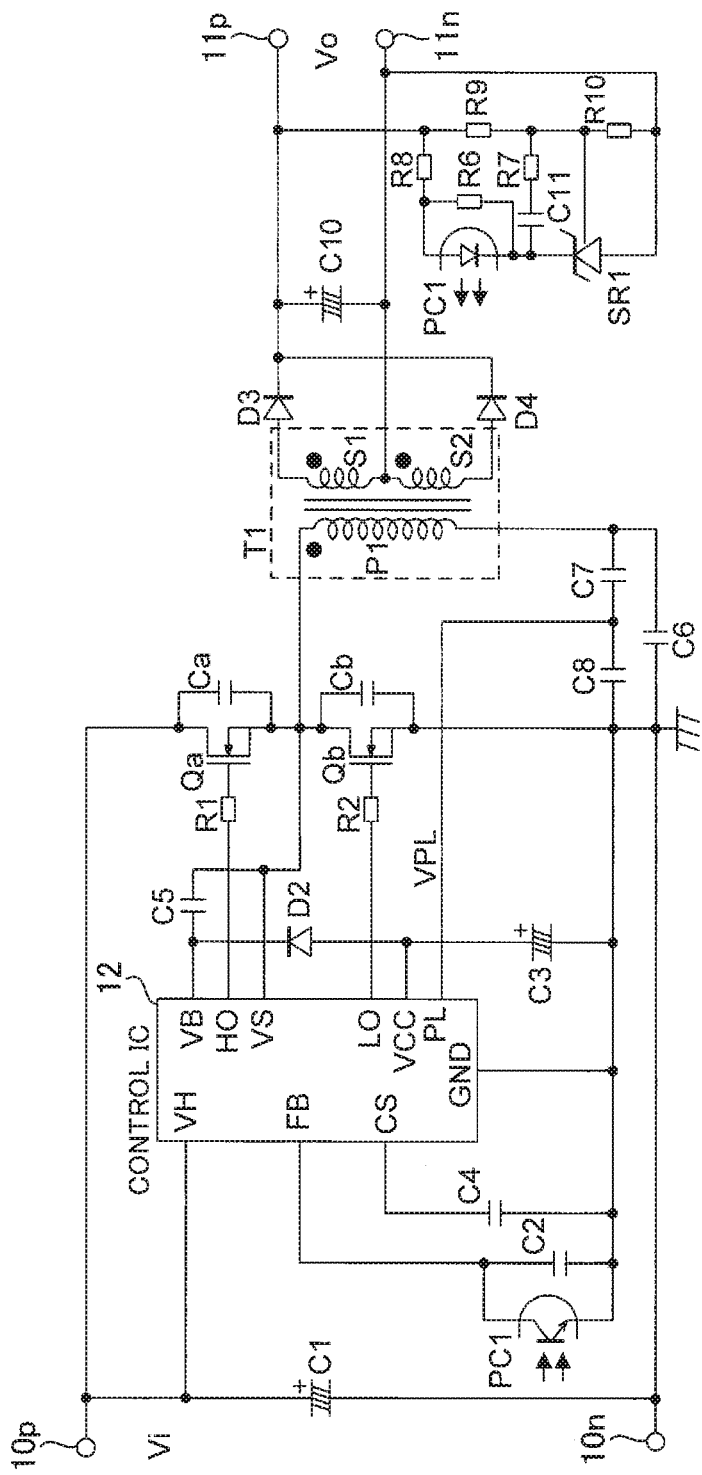
FIG. 11 is a circuit diagram illustrative of an example of the structure of a switching power supply apparatus including a current resonance DC-DC converter, according to a second embodiment.

FIG. 11 is a circuit diagram illustrative of an example of the structure of a switching power supply apparatus including a current resonance DC-DC converter, according to a second embodiment. Components in FIG. 11 which are the same as or equivalent to those illustrated in FIG. 1 are marked with the same numerals and detailed descriptions of them will be omitted.

With the switching power supply apparatus according to the above first embodiment peak power at burst operation time is monitored by a signal outputted from the voltage division circuit of the resistors R3 and R4 connected in series which are connected in parallel with the resonance capacitor C6. With a switching power supply apparatus according to a second embodiment, on the other hand, peak power at burst operation time is monitored by a signal outputted from a voltage division circuit of capacitors C7 and C8 connected in series which are connected in parallel with the resonance capacitor C6. Accordingly, a switching power supply apparatus according to a second embodiment differs from the switching power supply apparatus according to the first embodiment only in the structure of the voltage division circuit. The operation of a switching power supply apparatus according to a second embodiment is the same as that of the switching power supply apparatus according to the first embodiment.

In this embodiment threshold voltages Vref_h and Vref_l of a peak power limiting circuit 27 are determined by:

$$Vref\_h=(Vi/2+\Delta Vcr/2)*C7/(C7+C8)$$

$$Vref\_l=(Vi/2-\Delta Vcr/2)*C7/(C7+C8)$$

Third Embodiment

Figure 12:
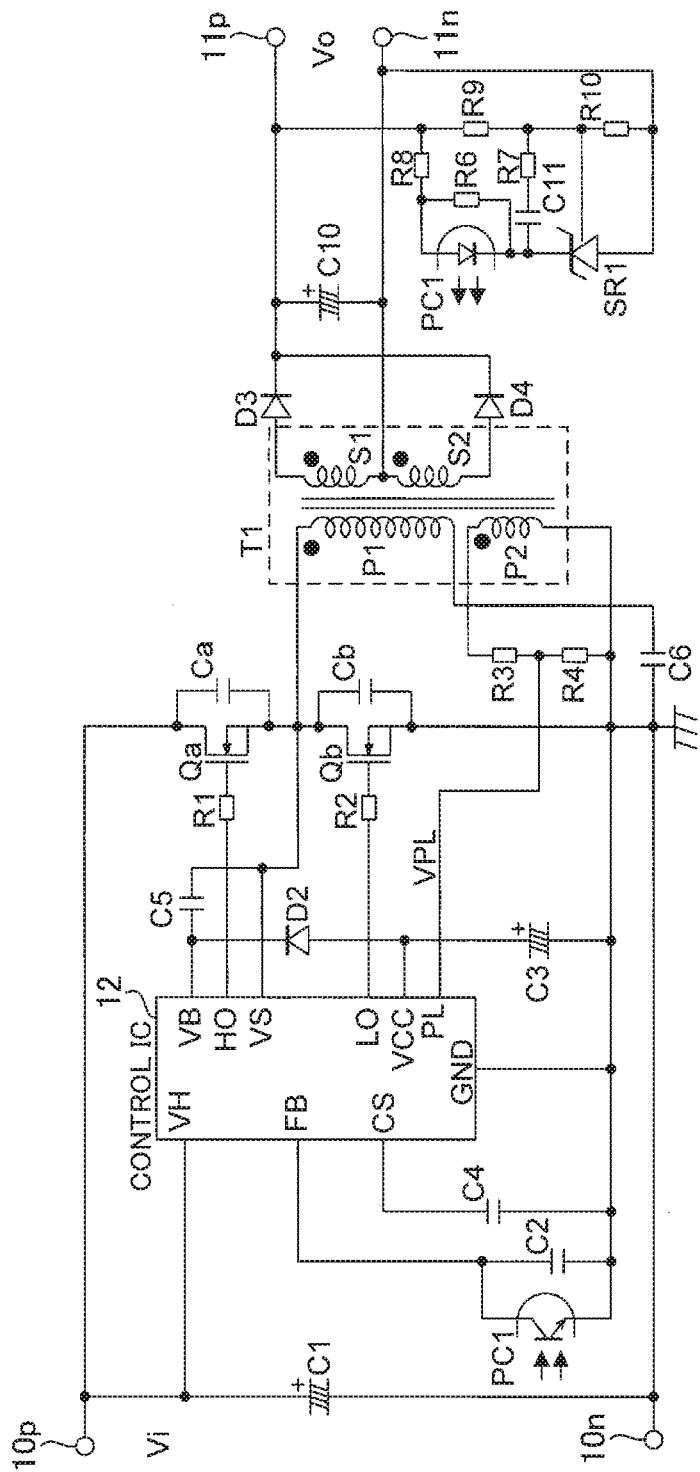
FIG. 12 is a circuit diagram illustrative of an example of the structure of a switching power supply apparatus including a current resonance DC-DC converter, according to a third embodiment.
Figure 13:
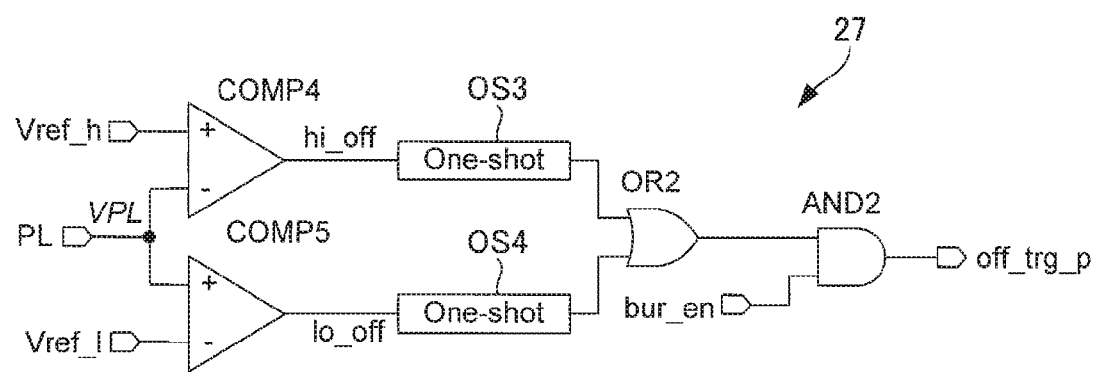
FIG. 13 is a circuit diagram illustrative of an example of the structure of a peak power limiting circuit.
Figure 14:
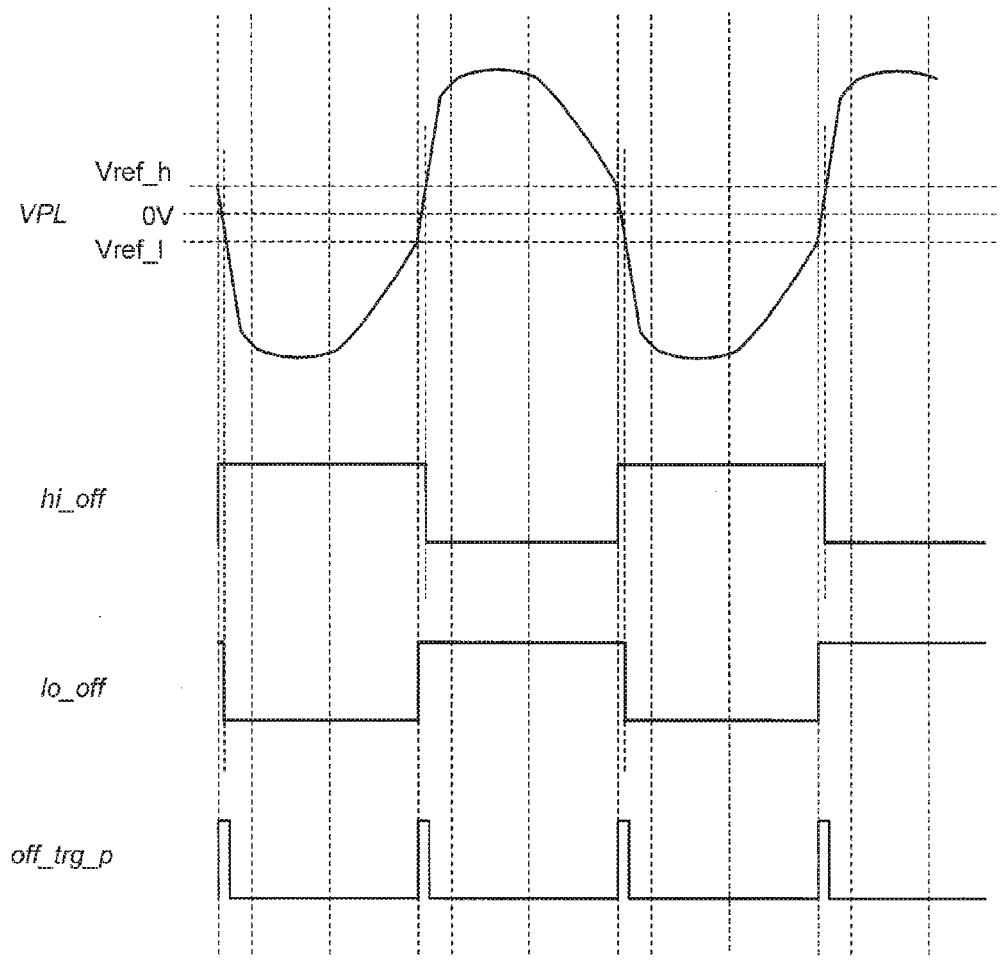
FIG. 14 illustrates the operation sequence of the peak power limiting circuit.

FIG. 12 is a circuit diagram illustrative of an example of the structure of a switching power supply apparatus including a current resonance DC-DC converter, according to a third embodiment. FIG. 13 is a circuit diagram illustrative of an example of the structure of a peak power limiting circuit. FIG. 14 illustrates the operation sequence of the peak power limiting circuit. Components in FIGS. 12, 13, and 14 which are the same as or equivalent to those illustrated in FIGS. 1, 5, and 8, respectively, are marked with the same numerals and detailed descriptions of them will be omitted.

With the switching power supply apparatus according to the above first and second embodiments peak power at burst operation time is monitored by a voltage across the resonance capacitor C6. With the switching power supply apparatus according to the third embodiment, on the other hand, peak power at burst operation time is monitored, as illustrated in FIG. 12, by a voltage across an auxiliary winding P2 of a transformer T1.

With the switching power supply apparatus according to the third embodiment the transformer T1 includes the auxiliary winding P2. One terminal of the auxiliary winding P2 is connected to one terminal of a resistor R3. The other terminal of the auxiliary winding P2 is connected to one terminal of a resistor R4 and a ground. The other terminal of the resistor R3 and the other terminal of the resistor R4 are connected and a connection point of the resistors R3 and R4 is connected to a PL terminal of a control IC 12.

At burst operation time the auxiliary winding P2 outputs a voltage approximately proportional to a voltage applied to a primary winding P1. The output voltage of the auxiliary winding P2 is divided by a voltage division circuit made up of the resistors R3 and R4 and is supplied to the PL terminal of the control IC 12.

As illustrated in FIG. 13, components of a peak power limiting circuit 27 which monitors the output voltage of the auxiliary winding P2 are the same as those illustrated in FIG. 5. However, the peak power limiting circuit 27 in the switching power supply apparatus according to the third embodiment differs from the peak power limiting circuit 27 illustrated in FIG. 5 in the structure of inputs to comparators COMP4 and COMP5. That is to say, a non-inverting input terminal of the comparator COMP4 is connected to a terminal which receives a threshold voltage Vref_h generated inside the control IC 12. An inverting input terminal of the comparator COMP5 is connected to a terminal which receives a threshold voltage Vref_l generated inside the control IC 12. An inverting input terminal of the comparator COMP4 and a non-inverting input terminal of the comparator COMP5 are connected to the PL terminal of the peak power limiting circuit 27.

The threshold voltages Vref_h and Vref_l of the peak power limiting circuit 27 are determined by:

$$Vref\_h=(Vi/2-\Delta Vcr/2)*R4/(R3+R4)*(1/N)$$

$$Vref\_l=-Vref\_h$$

where N is a winding ratio between the primary winding P1 and the auxiliary winding P2.

As illustrated in FIG. 14, the waveform of a voltage VPL supplied to the PL terminal of the peak power limiting circuit 27 rises and falls with a ground potential as reference. When the voltage VPL falls below the high-side threshold voltage Vref_h, the comparator COMP4 outputs an H-level signal hi_off. A one-shot circuit OS3 which receives the signal hi_off outputs a signal having a determined on-width and rising in synchronization with the rising edge of the signal hi_off. The signal outputted from the one-shot circuit OS3 is outputted via an OR circuit OR2 and an AND circuit AND2 to an output terminal of the peak power limiting circuit 27 as a forced turn-off signal off_trg_p.

On the other hand, when the voltage VPL exceeds the low-side threshold voltage Vref_l, the comparator COMP5 outputs an H-level signal lo_off. A one-shot circuit OS4 which receives the signal lo_off outputs a signal having a determined on-width and rising in synchronization with the rising edge of the signal lo_off. The signal outputted from the one-shot circuit OS4 is outputted via the OR circuit OR2 and the AND circuit AND2 to the output terminal of the peak power limiting circuit 27 as a forced turn-off signal off_trg_p. The forced turn-off signal off_trg_p is supplied to an oscillation circuit 22.

In order to limit power in the third embodiment, the threshold voltage Vref_h is set to a high voltage and the threshold voltage Vref_l is set to a low voltage. By doing so, timing at which the signal hi_off and the signal lo_off rise becomes earlier. As a result, timing at which the oscillation circuit 22 outputs an off-trigger signal off_trg in burst operation in a standby mode is earlier than timing at which the oscillation circuit 22 outputs an off-trigger signal off_trg in a normal mode.

If the control IC 12 does not have a negative voltage power source, then a level shift circuit is located inside the control IC 12 to shift up the voltage level of a signal inputted to the PL terminal. Various thresholds are adjusted to a voltage level of the signal after the shift-up.

The switching power supply apparatus having the above structure has the following advantage. When input power monitored at burst operation time in a standby mode exceeds a determined value, a forced turn-off signal is outputted earlier than a regular off-trigger signal to suppress peak power and reduce audible noise.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply apparatus having a standby mode in which a burst operation is performed, comprising:
    a high-side first switching element and a low-side second switching element which are connected in series and across which a direct current (DC) input voltage is applied;
    a resonant circuit including a resonance reactor and a resonance capacitor connected in series, the resonant circuit being connected in parallel with one of the first switching element and the second switching element; and
    a controller configured to alternately on-off control the first switching element and the second switching element, the controller including:
        a peak power limiting circuit configured to monitor an input power and output a forced turn-off signal upon detecting that the input power exceeds a determined value,
        a charge and discharge circuit configured to generate a triangular wave voltage during a period of a soft start operation of the burst operation, and a period of a soft end operation of the burst operation, and
        an oscillation circuit configured to receive the forced turn-off signal from the peak power limiting circuit, and to receive the triangular wave voltage to generate an on-trigger signal and an off-trigger signal at a switching frequency corresponding to a value of the triangular wave voltage and output the off-trigger signal upon the receipt of the forced turn-off signal.

2. The switching power supply apparatus according to claim 1, wherein the peak power limiting circuit includes
    a first comparator, which compares a first threshold and a signal indicative of the input power,
    a first one-shot circuit connected to an output of the first comparator and outputting a first pulse upon the signal indicative of the input power exceeding the first threshold,
    a second comparator which compares a second threshold lower than the first threshold and the signal indicative of the input power,
    a second one-shot circuit connected to an output of the second comparator and outputting a second pulse upon the signal indicative of the input power falling below the second threshold,
    an OR circuit that receives outputs of the first one-shot circuit and the second one-shot circuit, and
    an AND circuit that receives an output of the OR circuit and a burst operation signal, and outputs the forced turn-off signal.

3. The switching power supply apparatus according to claim 1, wherein the input power is monitored by monitoring a voltage across the resonance capacitor with the peak power limiting circuit.

4. The switching power supply apparatus according to claim 3, further comprising a voltage divider comprised of resistors, the voltage across the resonance capacitor being divided by the voltage divider to be inputted to the peak power limiting circuit.

5. The switching power supply apparatus according to claim 3, further comprising a voltage divider comprised of capacitors, the voltage across the resonance capacitor being divided by the voltage divider to be inputted to the peak power limiting circuit.

6. The switching power supply apparatus according to claim 1, wherein the resonance reactor includes a transformer having primary, secondary, and auxiliary windings, the input power being monitored by monitoring with the peak power limiting circuit a voltage across the auxiliary winding of the transformer.

7. The switching power supply apparatus according to claim 6, further comprising a voltage divider comprised of resistors, the voltage across the auxiliary winding being divided by the voltage divider before being inputted to the peak power limiting circuit.

* * * * *